US005500322A

United States Patent [19]

Tanaka et al.

[11] Patent Number: 5,500,322

[45] Date of Patent: Mar. 19, 1996

[54] DEVELOPER ADDITIVE, TONER AND DEVELOPER COMPOSITION

[75] Inventors: Shingo Tanaka; Tetsuya Ueno; Akito Itoi; Isao Nishi, all of Wakayama, Japan

[73] Assignee: Kao Corporation, Tokyo, Japan

[21] Appl. No.: 338,821

[22] Filed: Nov. 10, 1994

Related U.S. Application Data

[63] Continuation of Ser. No. 49,441, Apr. 20, 1993, abandoned.

[30] Foreign Application Priority Data

| | | | |
|---|---|---|---|
| May 18, 1992 | [JP] | Japan | 4-124599 |
| May 18, 1992 | [JP] | Japan | 4-124600 |
| May 18, 1992 | [JP] | Japan | 4-124601 |
| May 18, 1992 | [JP] | Japan | 4-124602 |
| May 18, 1992 | [JP] | Japan | 4-124603 |

[51] Int. Cl.[6] ..... C03G 7/057

[52] U.S. Cl. ..... 430/110

[58] Field of Search ..... 430/110, 106

[56] References Cited

U.S. PATENT DOCUMENTS

| | | | |
|---|---|---|---|
| 4,299,899 | 11/1981 | Azar et al. | 430/110 |
| 4,465,756 | 8/1984 | Mikami et al. | 430/110 |
| 4,795,690 | 1/1989 | Shinalo et al. | 430/110 |
| 5,102,766 | 4/1992 | Nanya et al. | 430/110 |
| 5,238,768 | 4/1993 | Ong | 430/110 |
| 5,252,420 | 10/1993 | Tanaka et al. | 430/110 |

FOREIGN PATENT DOCUMENTS

| | | | |
|---|---|---|---|
| 0355006 | 3/1990 | European Pat. Off. . | |
| 0464829 | 1/1992 | European Pat. Off. . | |
| 4040469 | 7/1991 | Germany . | |
| 61-156149 | 7/1986 | Japan | 430/110 |
| 63-155056 | 6/1988 | Japan | 430/110 |

OTHER PUBLICATIONS

Patent Abstracts Of Japan, vol. 10, No. 358 (P-522) (2415) 2 Dec. 1986.

Patent Abstracts Of Japan, vol. 14, No. 317 (P-1073) 9 Jul. 1990.

Patent Abstracts Of Japan, vol. 10, No. 149 (P-461) (2206) 30 May 1986.

Grant, Roger and Claire Grant, editors, *Grant and Hackh's Chemical Dictionary,* fifth edition, p. 24, (1987).

English abridgement of JP 2000986 (cited in instant specification).

*Primary Examiner*—Christopher D. Rodee

*Attorney, Agent, or Firm*—Birch, Stewart, Kolasch & Birch

[57] ABSTRACT

A developer additive selected from the group consisting of compounds represented by the general formulas (1) to (5):

(1)

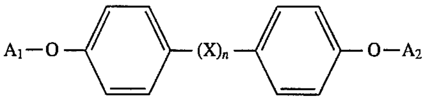

(2)

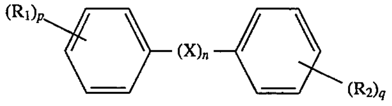

(3)

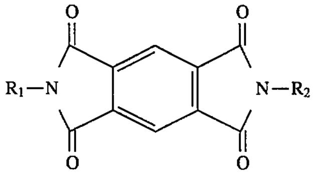

(4)

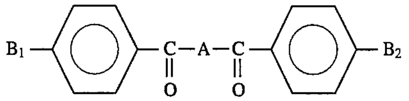

and (5)

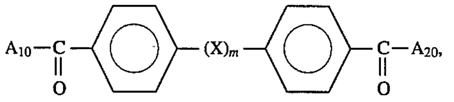

a toner composition having excellent fixing properties and improved pulverizability which comprises the developer additive, a binder resin and a colorant and a developer composition having excellent toner-fixing properties which comprises the developer additive, a binder resin and a colorant.

12 Claims, No Drawings

DEVELOPER ADDITIVE, TONER AND DEVELOPER COMPOSITION

This application is a continuation, of application Ser. No. 08/049,441 filed on Apr. 20, 1993, now abandoned.

BACKGROUND OF THE INVENTION

1. Field of the Invention

The present invention relates to a developer additive which is incorporated into a toner composition or a developer composition used for developing an electrostatic image in electrophotography, electrostatic recording and electrostatic printing. The present invention also relates to a toner composition and a developer composition containing the developer additive. In particular, the present invention relates to a developer additive capable of improving toner-fixabilities, such as low-temperature fixability and offset resistance, and pulverizability of the toner composition when it is incorporated into a toner composition or a developer composition for electrophotography.

2. Description of the Related Art

As described in U.S. Pat. Nos. 2,297,691 and 2,357,809, conventional electrophotographic processes comprise uniformly charging a photoconductive insulating layer, exposing this layer to light, expelling the charge from the exposed part to thereby form an electric latent image, depositing a colored, charged fine powder called "toner" on the latent image to visualize the image (development step), transferring the visible image thus formed to a transfer material such as transfer paper (transfer step), and permanently fixing the image by heating, by the application of pressure or some other suitable fixing method (fixing step).

Therefore, the toner, that is, the toner composition, must have the functions required not only in the development step but also in the transfer and fixing steps of the electrophotographic process.

Recently, it is eagerly desired to provide prints with a higher quality at a higher speed on an electrophotographic copying machine, printer or the like. Various processes and apparatuses have been developed for fixing toner images in order to satisfy this demand. A process most ordinarily employed at present is the so-called hot roller fixing process wherein heat and pressure are simultaneously applied.

In high-speed copying machines or the like of the above-described fixing type, such a large amount of heat of the hot roller is lost by the image support that the heat supply will not meet the necessary requirements, since the fixing step is successively conducted many times and, as a result, the temperature of the hot roller is lowered which makes the fixing insufficient. Thus in high-speed copying machines or the like, the development of a toner composition which is fixable at a lower temperature is demanded.

Since polyester resins have an essentially high fixability, a toner composition comprising a polyester resin can be sufficiently fixed even by a non-contact fixing method as described, for example, in U.S. Patent No. 3,590,000. However, it has been difficult to use such a toner composition in the above-described hot roller fixing process, since an offset phenomenon is apt to occur.

The offset phenomenon is one wherein a molten toner composition is brought into contact with the surface of a hot roller in the hot roller fixing step whereby a part of the molten toner composition adheres to the surface of the hot roller and is then retransferred to the next image support to stain the image.

Thus in the high-speed copying machines of the hot-roller fixing type, the development of the following toner compositions are eagerly needed:

A: toner compositions having an excellent offset resistance, and

B: toner compositions having an excellent low-temperature fixability.

To improve the offset resistance, it has been proposed to use a crosslinked resin (hereinafter referred to as means 1).

To improve the low-temperature fixability while satisfying the offset resistance, it has been proposed to use a resin having a soft segment introduced into the side chain (hereinafter referred to as means 2).

Further, a process wherein a low-molecular polyolefin wax is incorporated into the toner composition in order to impart to the toner composition a releasability from the fixing roller has also been employed (hereinafter referred to as means 3).

Furthermore, a process for reconciling the fixability of a toner composition to paper with the releasability of a toner composition from the fixing roller by improving the response of the toner composition to the heat of the fixing hot roller by incorporating an aromatic bisamide having a molecular weight of 500 to 1500 as a fixability-improving assistant into the toner composition or the developer composition has been proposed (hereinafter referred to as means 4) (see Japanese Patent Publication-A No. 986/1990).

However, the above-described means 1 has a problem that when only the crosslinked resin is used, the fixing temperature is so elevated that the unfixed part remains under ordinary fixing conditions to stain the image.

Although the fixability can be surely improved by the above-described means 2, the toughness of the resin is increased, thereby reducing the pulverizability of the resin which is concerned with the productivity of the toner composition, thereby reducing the productivity of the toner composition.

Although the above-described means 3 is effective in preventing offset, the addition of a large amount of the wax impairs the chargeability as a result of a reduction in the fluidity of the toner composition. On the contrary, when the wax is added in a small amount, no effect can be obtained.

Although the fixability can be improved by the above-described means 4, a lot-to-lot variation in the melt viscosity of the toner composition or the developer composition is caused, since the aromatic bisamide reduces the degree of polymerization, that is, the molecular weight, of the binder resin having a functional group such as an ester group and an amido group, as the case may be. Thus the stable production of the toner composition or the developer composition is difficult.

The present invention has been made under these circumstances, and thus an object of the present invention is to provide a developer additive capable of improving the toner-fixabilities, such as low-temperature fixability and offset resistance, and pulverizability of a toner composition, and a toner composition and a developer composition containing the developer additive.

DISCLOSURE OF THE INVENTION

Summary of the Invention

After extensive investigations made for the purpose of attaining the above-described objects, the present inventors have completed the present invention.

Thus, the present invention provides a developer additive selected from the group consisting of compounds represented by the general formulas (1) to (5):

(1)

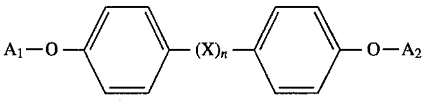

wherein $A_1$ and $A_2$ each represent an alkyl group, an alkenyl group or an arylalkyl group, n represents 0 or 1, and X represents any of

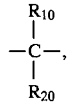

—S—, —$SO_2$— and —O— (in which $R_{10}$ and $R_{20}$ each represent a hydrogen atom or an alkyl group having 4 or less carbon atoms, that is, 1 to 4 carbon atoms), (2)

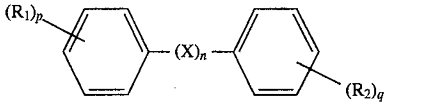

wherein $R_1$ and $R_2$ each represent an alkyl group or an alkenyl group, p and q each represent an integer with a proviso that the total of p+q is 1 to 3, n represents 0 or 1, and X represents any

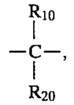

—S—, —$SO_2$— and —O— (in which $R_{10}$ and $R_{20}$ each represent a hydrogen atom or an alkyl group having 4 or less carbon atoms, that is, 1 to 4 carbon atoms), (3)

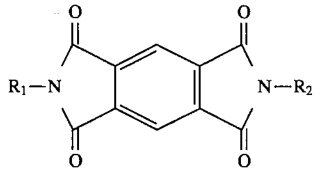

wherein $R_1$ and $R_2$ each represent an alkyl group or an alkenyl group, (4)

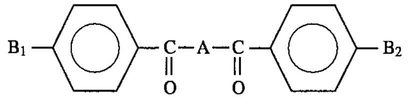

wherein $B_1$ and $B_2$ each represent an alkyl group, an alkenyl group, an acyl group or an alkoxy group, and A represents a divalent aliphatic hydrocarbon group, a divalent alicyclic hydrocarbon group or a divalent aromatic hydrocarbon group, and (5)

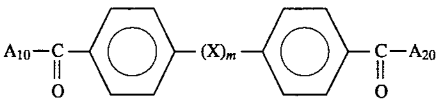

wherein A10 and A20 each represent a hydrocarbon group, m represents 0 or 1, and X represents any

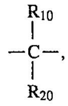

—S—, —$SO_2$— and —O— (in which $R_{10}$ and $R_{20}$ each represent a hydrogen atom or an alkyl group having 4 or less carbon atoms, that is, 1 to 4 carbon atoms).

The present invention also provides a toner composition comprising the above-described additive, a binder resin and a colorant, and a developer composition comprising the above-described additive, a binder resin and a colorant.

Further scope and the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

The developer additive according to the present invention is one member selected from the group consisting of compounds represented by the general formulas (1) to (5) described above.

Although the number of carbon atoms of each of $A_1$ and $A_2$ can be selected without limitation in the compounds represented by the general formula (1) according to the present invention, it is preferably 6 to 18 carbon atoms. When the number of carbon atoms of $A_1$ or $A_2$ is below 6, the effect of improving the fixability of a toner containing such a compound is insufficient and, on the contrary, when it exceeds 18, the compatibility of such a compound with a resin is reduced to unfavorably impair the fluidity, chargeability and blocking resistance of a toner composition containing the compound.

Examples of $A_1$ and $A_2$ include straight-chain alkyl groups such as n-hexyl group, n-octyl group, n-dodecyl group and n-octadecyl group; branched alkyl groups such as 2-hexyldecyl group and methyl-branched octadecyl group; and arylalkyl groups such as benzyl group and 2-phenylethyl group.

The compounds represented by the general formula (1) according to the present invention can be easily produced by reacting an aromatic glycol represented by the following general formula (11):

(11)

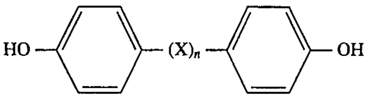

wherein X and n are as defined above with respect to the general formula (1), with an alkyl halide and/or an arylalkyl halide in the presence of an alkali catalyst such as NaOH and KOH.

Examples of the compounds represented by the general formula (1) according to the present invention include the following compounds:

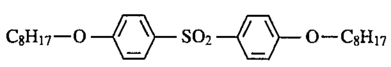

-continued (hereinafter abbreviated to invention compound (1))

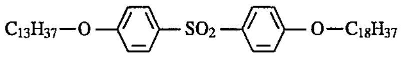

(hereinafter abbreviated to invention compound (2))

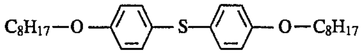

(hereinafter abbreviated to invention compound (3))

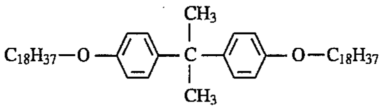

(hereinafter abbreviated to invention compound (4))

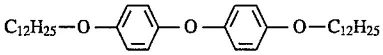

(hereinafter abbreviated to invention compound (5))

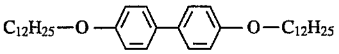

(hereinafter abbreviated to invention compound (6))

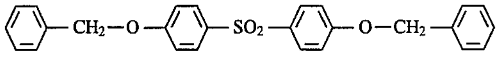

(hereinafter abbreviated to invention compound (7))

In the compounds represented by the general formula (2) according to the present invention, $R_1$ and $R_2$ each represent a straight-chain or branched, alkyl or alkenyl group, and the number of carbon atoms thereof can be selected without limitation. However, the number of carbon atoms is preferably 6 to 18. When the number of the carbon atoms of $R_1$ or $R_2$ is below 6, the effect of improving the fixability of a toner composition containing such a compound is insufficient and, on the contrary, when it exceeds 18, the compatibility of such a compound with a resin is reduced to unfavorably impair the fluidity, chargeability and blocking resistance of a toner composition containing the compound. Examples of $R_1$ and $R_2$ include a hexyl group, an octyl group, a dodecyl group and an octadecyl group.

The compounds represented by the general formula (2) according to the present invention can be easily produced by a well-known process. For example, the compound is obtained by reacting biphenyl, diphenyl ether, diphenyl sulfide or the like with an α-olefin in the presence of a catalyst such as aluminum chloride or boron trifluoride ethyl ether.

Examples of the compounds represented by the general formula (2) according to the present invention include the following ones:

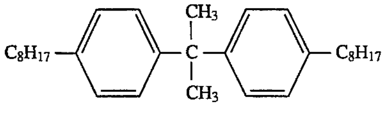

(hereinafter abbreviated to invention compound (11))

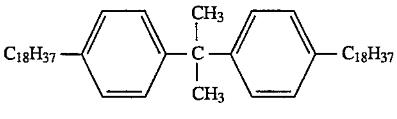

(hereinafter abbreviated to invention compound (12))

-continued

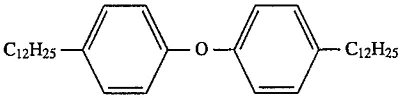

(hereinafter abbreviated to invention compound (13))

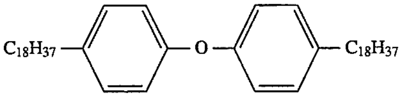

(hereinafter abbreviated to invention compound (14))

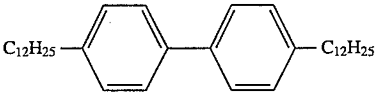

(hereinafter abbreviated to invention compound (15))

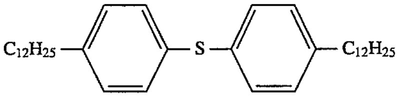

(hereinafter abbreviated to invention compound (16))

In the compounds represented by the general formula (3) according to the present invention, $R_1$ and $R_2$ each represent a straight-chain or branched, alkyl or alkenyl group, and the number of carbon atoms thereof can be selected without limitation. However, the number of carbon atoms is preferably 8 to 22, still preferably 8 to 18. Further, $R_1$ and $R_2$ each represent preferably a straight-chain alkyl or alkenyl group, and a compound wherein $R_1$=$R_2$ is particularly preferable. When the number of the carbon atoms of $R_1$ or $R_2$ is below 8, the effect of improving the fixability of a toner composition containing such a compound is insufficient and, on the contrary, when it exceeds 22, the compatibility of such a compound with a resin is reduced to unfavorably impair the fluidity, chargeability and blocking resistance of a toner composition containing the compound. Examples of $R_1$ and $R_2$ include octyl group, dodecyl group and octadecyl group.

The compounds represented by the general formula (3) according to the present invention can be easily produced by reacting 1 mol of pyromellitic anhydride with 2 mol of an amine to form a dicarboxy diamide compound and condensing this compound through dehydration.

Examples of the compounds represented by the general formula (3) according to the present invention include the following ones:

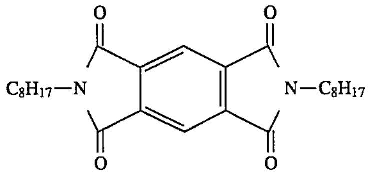

(hereinafter abbreviated to invention compound (21))

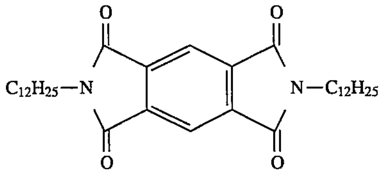

(hereinafter abbreviated to invention compound (22))

-continued

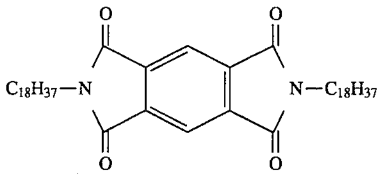

(hereinafter abbreviated to invention compound (23))

Although the number of carbon atoms of each of $B_1$ and $B_2$ is not limited in the compounds represented by the general formula (4) according to the present invention, it is preferably 3 to 18. The total number of the carbon atoms of $B_1$, $B_2$ and A is preferably 6 to 40. When the total number of the carbon atoms of $B_1$, $B_2$ and A is below 6, the effect of improving the fixability of a toner composition containing such a compound is insufficient and, on the contrary, when it exceeds 40, the compatibility of such a compound with a resin is reduced to unfavorably impair the fluidity, chargeability and blocking resistance of a toner composition containing the compound.

Examples of $B_1$ and $B_2$ include straight-chain alkyl groups such as n-propyl group, n-butyl group, n-hexyl group, n-octyl group, n-decyl group, n-dodecyl group, n-tetradecyl group, n-hexadecyl group, n-octadecyl group, n-eicosyl group and n-docosyl group; branched alkyl groups such as isopropyl group, isobutyl group, sec. butyl group, tert. butyl group, isopentyl group, neopentyl group, tert. pentyl group, 2-ethylhexyl group, 1-hexylnonyl group, 1-butylpentyl group, methyl-branched heptadecyl group, 1,1,3,3-tetramethylbutyl group, 1,3,5-trimethylhexyl group and 1,3,5,7-tetramethyloctyl group; cycloalkyl groups such as cyclohexyl group; and alkoxy groups such as n-propyloxy group, n-butoxy group, n-hexyloxy group, n-octyloxy group, n-decyloxy group, n-dodecyloxy group and 2-ethylhexyloxy group.

In the general formula (4), A represents a straight-chain or branched, divalent aliphatic hydrocarbon group, a substituted or unsubstituted, divalent allcyclic hydrocarbon group or a substituted or unsubstituted divalent aromatic hydrocarbon group, and examples thereof include $—(CH_2)_2—$, $—(CH_2)_3—$, $—(CH_2)_4—$, $—(CH_2)_8—$,

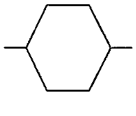, 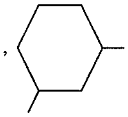, 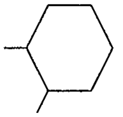,

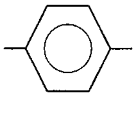, 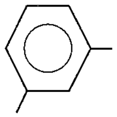, 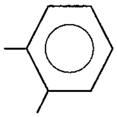 and

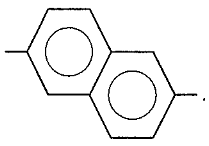.

The compounds represented by the general formula (4) according to the present invention can be easily produced by acylating an alkylbenzene, an alkoxybenzene or the like with a halide or a dicarboxylic acid anhydride represented by the following general formula (12):

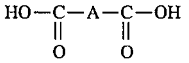 (12)

wherein A is as defined above with respect to the general formula (4), in the presence of a Lewis acid as the catalyst through the Friedel-Crafts reaction.

Examples of the compounds represented by the general formula (4) according to the present invention include the following ones:

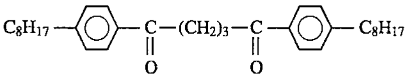

(hereinafter abbreviated to invention compound (31))

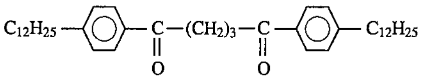

(hereinafter abbreviated to invention compound (32))

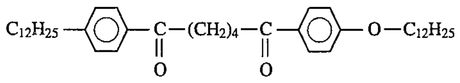

(hereinafter abbreviated to invention compound (33))

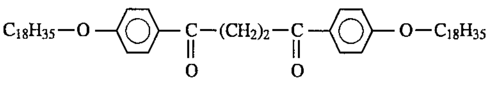

(hereinafter abbreviated to invention compound (34))

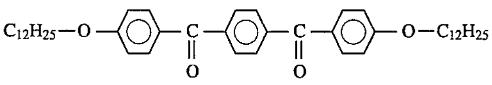

(hereinafter abbreviated to invention compound (35))

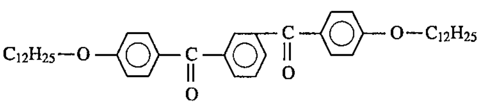

(hereinafter abbreviated to invention compound (36))

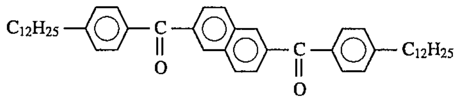

(hereinafter abbreviated to invention compound (37))

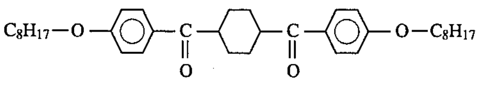

(hereinafter abbreviated to invention compound (38))

In the compounds represented by the general formula (5) according to the present invention, $A_{10}$ and $A_{20}$ each represent a hydrocarbon group and the number of carbon atoms thereof can be selected without limitation. However, the number of carbon atoms is preferably 5 to 21. When the number of carbon atoms of $A_{10}$ or $A_{20}$ is below 5, the effect of improving the fixability of a toner composition containing such a compound is insufficient and, on the contrary, when it exceeds 21, the compatibility of such a compound with a resin is reduced to unfavorably impair the fluidity, chargeability and blocking resistance of a toner composition containing the compound.

Examples of $A_{10}$ and $A_{20}$ include saturated alkyl groups such as straight-chain alkyl groups, e.g. n-pentyl group, n-heptyl group, n-nonyl group, n-undecyl group, n-tridecyl group, n-pentadecyl group, n-heptadecyl group, n-nonadecyl group and n-heneicosyl group, branched alkyl groups, e.g. 1-hexylnonyl group, 1-butylpentyl group and methyl-branched heptadecyl group and cycloalkyl groups, e.g. cyclohexyl group; and 8-heptadecenyl group, 9-decenyl group, benzyl group and 2-phenylethyl group.

The compounds represented by the general formula (5) according to the present invention can be easily produced by a well-known process, that is, a process comprising a Friedel-Crafts reaction of a corresponding aromatic compound represented by the general formula (13):

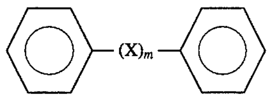

(13)

wherein X and m are as defined above with respect to the general formula (5), with a carboxylic acid, a carboxylic acid anhydride or a carboxylic acid chloride in the presence of an acid catalyst. For example, the compound can be produced by acylating biphenyl, bisphenyl ether, diphenyl sulfide or the like with an acid chloride in the presence of a Lewis acid such as $AlCl_3$ as the catalyst through the Friedel-Crafts reaction.

Examples of the compounds represented by the general formula (5) according to the present invention include the following ones:

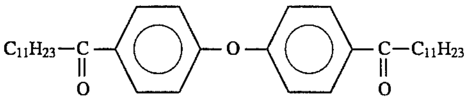

(hereinafter abbreviated to invention compound (41))

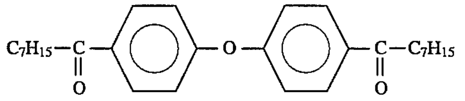

(hereinafter abbreviated to invention compound (42))

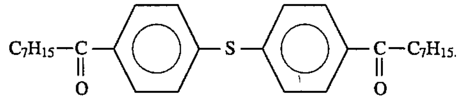

(hereinafter abbreviated to invention compound (43))

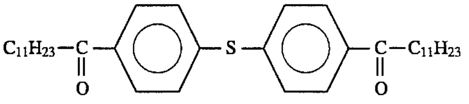

(hereinafter abbreviated to invention compound (44))

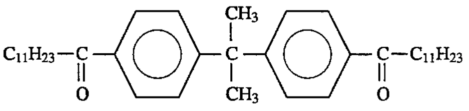

(hereinafter abbreviated to invention compound (45))

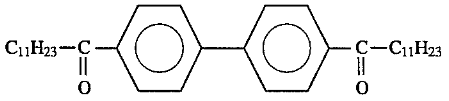

(hereinafter abbreviated to invention compound (46))

-continued

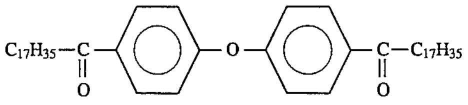

(hereinafter abbreviated to invention compound (47))

The toner composition according to the present invention comprises the above-described developer additive, a binder resin and a colorant.

The developer composition according to the present invention comprises the above-described developer additive, a binder resin and a colorant.

To exhibit the intended properties of the developer additive according to the present invention, the developer additive is incorporated in an amount of desirably 0.1 to 10.04 by weight, more desirably 0.5 to 8.04 by weight and most desirably 1.0 to 5.04 by weight based on the weight of the binder resin in the toner composition or the developer composition.

When the amount of the developer additive is below 0.14 by weight based on the weight of the binder resin, the effect of improving the toner-fixability is poor. On the contrary, when it exceeds 10.04 by weight, the fluidity, chargeability and blocking resistance of the toner composition tend to be impaired and the offset resistance of the toner composition tends to fall.

The addition method of the developer additive according to the present invention to a toner composition or an electrophotographic developer composition may be one wherein it is added in the course of the production of the binder resin or after the completion of the production thereof, or one wherein it is melt-mixed in the step of kneading the binder resin, the colorant and other additives used if necessary to prepare a toner composition.

The developer additive according to the present invention has excellent features in that it does not effect the reduction in the degree of polymerization of the binder resin or the formation of a low-molecular weight component, since it is a thermally stable compound which neither fumes nor is colored, even when it is exposed to a high temperature in the production of the binder resin, and since it is also a chemically stable compound against an esterification catalyst or a radical polymerization initiator used in the production of the binder resin and does not exert any influence on the functional groups such as the ester group and the amido group of the binder resin.

It is conceivable that the developer additive according to the present invention has a releasability of the toner composition from a hot roller fixing machine and a capacity of imparting a cohesive force to the toner composition, since the developer additive has an alkyl group or the like and aromatic rings having a high cohesive force in the molecule.

Further, it is also conceivable that the developer additive according to the present invention reduces the melt viscosity of the toner composition during passage through a hot roller fixing machine to exhibit the effect of aiding the transfer of the toner composition to the transfer paper and the like since the developer additive has the effect of reducing the melt viscosity of the binder resin.

The binder resins usable in the present invention include polyesters, polyester polyamides and polyamide resins formed by polycondensation and vinylic resins formed by addition polymerization.

The polyesters are produced from a polyhydric alcohol component and an acid component such as a polycarboxylic acid, a polycarboxylic ester or a polycarboxylic acid anhydride as the starting monomers.

A polyester comprising, as the constituent unit monomers, an acid component and a diol component which comprises compounds represented by the following general formula (6) with the proviso that the compounds have the same alkylene group as $R_3$ and which has the sum of x and y of 2 to 16 as the average value, are usable:

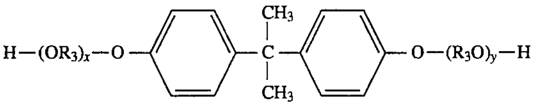
(6)

wherein $R_3$ represents an alkylene group having 2 to 4 carbon atoms, and x and y each represent a positive integer, preferably an integer of 1 to 8.

Namely, a bisphenol A/alkylene oxide adduct which comprises compounds represented by the above-described general formula (6) and which has the sum of x and y of 2 to 16 as the average value is usable to prepare a polyester as a dihydric alcohol component.

Examples of the bisphenol A/alkylene oxide adducts include polyoxypropylene(2.2)-2,2-bis(4-hydroxyphenyl)propane, polyoxypropylene(3.3)-2,2-bis( 4-hydroxyphenyl)propane, polyoxyethylene(2.0)-2,2-bis( 4-hydroxyphenyl)propane, polyoxyethylene(2.5)-2,2-bis( 4-hydroxyphenyl)propane, polyoxypropylene(2.0)-polyoxyethylene( 2.0)-2,2-bis(4-hydroxyphenyl)propane and polyoxypropylene(6.0)-2,2-bis(4-hydroxyphenyl)propane.

As the dihydric alcohol component for preparing a polyester, aliphatic diols such as ethylene glycol, diethylene glycol, triethylene glycol, 1,2-propylene glycol, 1,3-propylene glycol, 1,4-butanediol, neopentyl glycol, 1,5-pentanediol, 1,6-hexanediol, 1,4-cyclohexanedimethanol, dipropylene glycol, polyethylene glycol, polypropylene glycol and polytetramethylene glycol, and also other dihydric alcohols can be used.

When the above-described bisphenol A/alkylene oxide adduct is used as the constituent monomer, the obtained polyester has a relatively high glass transition point due to the properties of the bisphenol A skeleton. Therefore, a toner composition containing the polyester exhibits an excellent blocking resistance. In addition, since the bisphenol A skeleton has a high molecular weight, it contributes to an increase in the molecular weight of the polymer, and a toner composition containing the polyester comprising the above-described bisphenol A/alkylene oxide adduct as the constituent unit monomer exhibits an improved offset resistance.

As the acid component for preparing the polyester, the following dicarboxylic acid components are cited: maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, and dicarboxylic acids represented by the following general formulas (7) or (8):

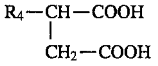
(7)

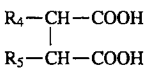
(8)

wherein $R_4$ and $R_5$ each represent a saturated or unsaturated hydrocarbon group having 4 to 20 carbon atoms, such as n-dodecylsuccinic acid, n-dodecenylsuccinic acid, n-octylsuccinic acid, isododecylsuccinic acid, isododecenylsuccinic acid and n-octenylsuccinic acid, and anhydrides and lower alkyl esters of these dicarboxylic acids, and other dicarboxylic acids.

When the offset resistance is particularly required, it is effective to use a binder resin which has a partial crosslinkage in the binder resin molecule in the toner composition or the electrophotographic developer composition.

The partial crosslinkage can be introduced into the binder resin molecule by using an at least trivalent polyfunctional compound, that is, a trivalent or higher polyfunctional compound. Examples of an at least trivalent polyol usable as the crosslinking agent include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane and 1,3,5-trihydroxymethylbenzene.

Examples of an at least trivalent polycarboxylic acid usable as the crosslinking agent include trimellitic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxylpropane, 1,2,4-cyclohexanetricarboxylic acid, tetra(methylenecarboxyl)methane, 1,2,7,8-octanetetracarboxylic acid, pyromellitic acid, Empol trimer acid, and anhydrides and lower alkyl esters of these acids. An example of particularly preferred tricarboxylic and higher polycarboxylic acids is trimellitic anhydride.

The trivalent or higher polyfunctional compound can be used in an amount of 0.5 to less than 15.0 mole % preferably 1.5 to less than 12.0 mole %, and still preferably 2.5 to less than 10.0 mole %, based on all the monomers.

The trivalent or higher polyols and trivalent or higher polycarboxylic acids can be used either singly or in combination. However, when their total amount is 15.0 mole % or more, the repeatability with respect to performances thereof such as softening point in the production of the polyester is unfavorably impaired since reactions which cause gelation may proceed.

When the trivalent or higher polyfunctional compound is used in an amount of below 0.5 mole % based on all the monomers, the toner composition containing the resultant polyester as the binder resin scarcely exhibits an improved offset resistance.

The polyester to be used in the present invention can be produced by polycondensing a polycarboxylic acid component with a polyol component in an inert gas atmosphere at 180° to 250° C. An ordinary esterification catalyst such as zinc oxide, stannous oxide, dibutyltin oxide or dibutyltin dilaurate can be used for accelerating the reaction. The polycondensation can be conducted under a reduced pressure for the same purpose as that described above.

Well-known polyester polyamides and polyamides are usable as a binder resin in the present invention. The starting monomers for the amide components of the polyester polyamides or polyamides include polyamines such as ethylenediamine, pentamethylenediamine, hexamethylenediamine, diethylenetriamine, iminobispropylamine, phenylenediamine, xylylenediamine and triethylenetetramine; amino carboxylic acids such as 6-aminocaproic acid and ε-caprolactam; and amino alcohols such as propanolamine.

The vinylic resins usable as the resins in the present invention are well-known. Typical monomers usable for forming the vinylic resins include, for example, styrene monomers such as styrene, o-methylstyrene, m-methylstyrene, p-methylstyrene, α-methylstyrene, p-ethylstyrene, 2,4-dimethylstyrene, p-chlorostyrene and vinylnaphthalene; ethylenically unsaturated monoolefins such as ethylene, propylene, butylene and isobutylene; vinyl esters such as vinyl chloride, vinyl bromide, vinyl fluoride, vinyl acetate, vinyl propionate, vinyl formate and vinyl caproate; ethylenic monocarboxylic acids and esters of them such as acrylic acid, methyl acrylate, ethyl acrylate, n-propyl acrylate, isopropyl acrylate, n-butyl acrylate, isobutyl acrylate, tert. butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloroethyl acrylate, phenyl acrylate, methyl α-chloroacrylate, methacrylic acid, methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate and diethylaminoethyl methacrylate; substituted ethylenic monocarboxylic acids such as acrylonitrile, methacrylonitrile and acrylamide; unsubstituted and substituted ethylenic dicarboxylic acids such as dimethyl maleate; vinyl ketones such as vinyl methyl ketone; vinyl ethers such as vinyl methyl ether; vinylidene halides such as vinylidene chloride; and N-vinyl compounds such as N-vinylpyrrole and N-vinylpyrrolidone.

When the crosslinking agent is added to prepare the vinylic resin, those which are ordinarily used include for example, divinylbenzene, divinylnaphthalene, polyethylene glycol dimethacrylate, diethylene glycol diacrylate, triethylene glycol diacrylate, 1,3-butylene glycol dimethacrylate, 1,6-hexylene glycol dimethacrylate, neopentyl glycol dimethacrylate, dipropylene glycol dimethacrylate, polypropylene glycol dimethacrylate, 2,2'-bis( 4-methacryloxydiethoxyphenyl)propane, 2,2'-bis(4acryloxydiethoxyphenyl)propane, trimethylolpropane trimethacrylate, trimethylolpropane triacrylate, tetramethylolmethane tetraacrylate, dibromoneopentyl glycol dimethacrylate and diallyl phthalate. They can be used singly or in a combination of two or more, if necessary.

When such a crosslinking agent is used in a large amount, the toner composition containing the resultant vinylic resin is difficult to melt by heat, which impairs the heat fixability or the heat-and-pressure fixability. On the contrary, when it is used in a small amount, it is difficult to prevent the offset phenomenon wherein a part of the toner composition is not completely fixed on the paper but adheres to the roller surface and therefore is transferred to the next paper in the heat roller fixing. Thus the crosslinking agent is used in an amount of 0.001 to 15% by weight, still preferably 0.1 to 10% by weight based on the weight of polymerizable monomers other than crosslinking agent.

The polymerization initiators usable in the production of the vinylic resin include azo and diazo polymerization initiators such as 2,2'-azobis(2,4-dimethylvaleronitrile), 2,2'-azobisisobutyronitrile, 1,1'-azobis(cyclohexane-1-carbonitrile), 2,2'-azobis- 4-methoxy-2,4-dimethylvaleronitrile and the like; and peroxide polymerization initiators such as benzoyl peroxide, methyl ethyl ketone peroxide, isopropyl peroxycarbonate, cumene hydroperoxide, 2,4-dichlorobenzoyl peroxide, lauroyl peroxide and dicumyl peroxide.

A mixture of two or more polymerization initiators is also usable in order to control the molecular weight and molecular weight distribution or to control the reaction time.

The polymerization initiator is used in an amount of 0.1 to 20 parts by weight, preferably 1 to 10 parts by weight, based on 100 parts by weight of the polymerizable monomer, that is, the sum of the above-described monoethylenic or monovinylic compound(s) and the crosslinking agent(s).

It is desirable that the binder resin used in the present invention have a softening point in the range of 95.0° to 160.0° C. as determined with a Koka flow tester. When the softening point of the binder resin is below 95.0° C., the offset resistance and the blocking resistance of the toner composition containing the binder resin are unsatisfactory, while when it exceeds 160.0° C., the low-temperature fixability is unsatisfactory.

The softening point of the binder resin determined with a Koka flow tester herein is defined as described below.

Namely, 1 $cm^3$ of the sample is melt flowed by using a Koka flow tester (CFT-500) (mfd. by Shimadzu Corporation) under the conditions comprising a die pore diameter of 1 mm, a pressure of 20 $kg/cm^2$ and a temperature rise rate of 6° C./min, and the softening point is defined as a temperature corresponding to one half of the height from the flow initiation point to the flow ending point.

As for other properties of the binder resin used in the present invention, the glass transition point of this resin as determined with a DSC (differential scanning calorimeter) is preferably 50.0° to 80.0° C. When it is below 50.0° C., the blocking resistance of the toner composition containing the binder resin is unsatisfactory and, on the contrary, when it is above 80° C., the low-temperature fixability is unsatisfactory.

The colorants usable in the present invention include carbon blacks produced by, for example, the thermal black method, the acetylene black method, the channel black method, the furnace black method, the lamp black method and the like for the black toners; and the copper phthalocyanine, monoazo pigments (C.I. Pigment Red 5, C.I. Pigment Orange 36 and C.I. Pigment Red 22), a disazo pigment (C.I. Pigment Yellow 83), an anthraquinone pigment (C.I. Pigment Blue 60), a disazo pigment (Solvent Red 19), a Rhodamine dye (Solvent Red 49) and the like for the color toners.

The toner composition according to the present invention is prepared, for example, by thoroughly mixing the colorant with the developer additive, the binder resin and, if necessary, a positive or negative charge control agent on a ball mill or the like to obtain a homogeneous dispersion, melt-kneading the dispersion on a kneader, and cooling and then pulverizing the resultant mixture. Thus, a colored powder, that is a toner composition, having an average particle diameter of 5 to 15 μm is obtained.

The positive charge control agents usable in the present invention range from low-molecular compounds to high-molecular ones (including polymers) without any particular limitation. Examples include "Nigrosine Base EX", "Oil Black BS" and "Oil Black SO" (products of Orient Chemical Industry Co., Ltd.) which are Nigrosine dyes, triphenylmethane dyes, quaternary ammonium compounds, and vinylic polmers having an amino group.

The negative charge control agents usable in the present invention include metal complex monoazo dyes, nitrohumic acid and its salts, substances having a nitro group or a halogen element, sulfonated copper phthalocyanine and maleic anhydride copolymers.

The toner composition according to the present invention may contain a fine magnetic powder which is used from the viewpoint of the developing mechanism or in order to improve the image. The magnetic powder includes alloys and compounds containing a ferromagnetic element, such as ferrites and magnetites. The magnetic powder can be used by dispersing it in the binder resin in an amount of 30 to 70% by weight based on the entire quantity of the toner composition in the form of a fine powder having an average particle diameter of 0.05 to 1 μm.

Known characteristics improvers which can be contained in the toner composition according to the present invention include, for example, offset inhibitors, fluidizing agents and thermal property improvers (such as metal complexes, e.g., chromium 3,5-di-tert.-butylsalicylate, and metal oxides, e.g., zinc oxide). They can be suitably used without hindering the present invention.

The developer composition according to the present invention comprises generally the above-described toner composition according to the present invention and a carrier. However, when the toner composition contains the above-described magnetic powder, the developer composition may contain no carrier.

A dry two-component developer composition according to the present invention comprises the toner composition according to the present invention and a suitable amount of a carrier, that is a magnetic powder, such as an amorphous carrier, a ferrite coated carrier or a spherical coated carrier, and is used by blending the toner composition with the carrier.

Since the toner composition of the present invention contains the thermally and chemically stable compound, that is, the developer additive selected from the group consisting of compounds represented by the general formulas (1) to (5), the toner composition has excellent fixing properties (low-temperature fixability and offset resistance) and an improved pulverizability due to the effect of the thermally and chemically stable additive compound.

Further, the electrophotographic developer composition of the present invention contains the above-described toner composition according to the present invention, and the electrophotographic developer composition has excellent toner-fixing properties (low-temperature fixability and offset resistance) due to the effect of the thermally and chemically stable additive compound.

EXAMPLES

The following Examples will further illustrate the present invention, but by no means should limit the present invention. In the Examples, parts are given by weight.

Production Example 1 (binder resin 1)

5.0 mol of polyoxypropylene(2.2)-2,2-bis(4-hydroxyphenyl)propane, 5.0 mol of ethylene glycol, 8.0 mol of terephthalic acid, 1.0 mol of 1,2,4-benzenetricarboxylic anhydride (trimellitic anhydride) and 5.0 g of dibutyltin oxide were fed into a four-necked glass flask. A thermometer, a stainless steel stirrer, a reflux condenser and a nitrogen-inlet tube were attached to the flask. The reaction was conducted in a nitrogen stream in a mantle heater at 190° C. for 3 h, at 220° C. for 3 h, at 240° C. for 3 h and at that temperature (240° C.) under a reduced pressure of 60 mmHg for 1 h to complete the reaction.

The resin thus obtained was in the form of a light yellow solid having a softening point determined with a flow tester of 128° C. and a glass transition point determined with a DSC of 67° C.

The resin thus obtained will be referred to binder resin 1.

Production Examples 2 to 4 (binder resins 2 to 4)

Binder resins 2 to 4 were produced in the same manner as that of Production Example 1 except that each of the starting composition listed in Table 1 was used. The softening point of each resultant resin determined with a flow tester and the glass transition point of each of them determined with a DSC are also given in Table 1.

TABLE 1

| Monomer | Binder resin: Binder resin 1 | Binder resin 2 | Binder resin 3 | Binder resin 4 |
|---|---|---|---|---|
| Starting compsn. (mol) | | | | |
| polyoxypropylene(2.2)-2,2-bis(4-hydroxyphenyl)propane | 5.0 | 7.0 | 5.5 | |
| polyoxyethylene(2.5)-2,2-bis(4-hydroxyphenyl)propane | | | 4.0 | |
| ethylene glycol | 5.0 | | | 2.0 |
| diethylene glycol | | 2.5 | | |
| neopentyl glycol | | | | 8.0 |
| glycerol | | 0.5 | 0.5 | |
| terephthalic acid | 8.0 | 8.0 | 5.0 | 8.0 |
| isododecenylsuccinic anhydride | | | 3.0 | |
| trimellitic anhydride | 1.0 | 1.5 | 1.0 | 1.2 |
| Flow tester softening point (°C.) | 128 | 138 | 120 | 135 |
| Glass transition point (°C.) | 67 | 68 | 65 | 65 |

Production Example 5 (binder resin 5)

550 g of xylene was fed into a 2-l four-necked glass flask equipped with a thermometer, a stainless steel stirrer, a reflux condenser, a dropping funnel and a nitrogen-inlet tube. After purging with nitrogen, the temperature was elevated to 135° C.

700 g of styrene, 300 g of butyl methacrylate and 50 g of dicumyl peroxide were fed into a dropping funnel and added dropwise to xylene over a period of 4 h. After aging at 135° C. for 5 h, the temperature was elevated to 200° C. and xylene was distilled off under reduced pressure. The resultant product was taken out into a vat, cooled and pulverized. The softening point of the product determined with a flow tester was 120° C. and the glass transition point determined with a DSC was 66° C.

The resultant resin will be referred to as binder resin 5.

Production Example 6 (binder resin 6)

700 g of styrene and 300 g of butyl methacrylate as the monomers for forming a vinylic resin, and 50 g of dicumyl peroxide as the polymerization initiator were fed into a dropping funnel.

390 g of polyoxypropylene(2.2)-2,2-bis(4-hydroxyphenyl)propane, 120 g of terephthalic acid, 38 g of 1,2,5-benzenetricarboxylic acid and 1 g of dibutyltin oxide were fed into a 5-l four-necked glass flask. A thermometer, a stainless steel stirrer, a reflux condenser and a nitrogen-inlet tube were attached to the flask. The monomers for forming a vinylic resin and the polymerization initiator in the dropping funnel were dropped into the flask under stirring at 135° C. in a nitrogen gas stream in a mantle heater over a period of 4 h. After aging at 135° C. for 5 h, the temperature was elevated and the reaction was conducted at 220° C.

The degree of polymerization was traced by determining the softening point according to ASTM E28-67, and the reaction was completed when the softening point had reached 128° C. The resin thus obtained was in the form of a light yellow solid having a softening point determined with a flow tester of 125° C. and a glass transition point determined with a DSC of 63° C.

The resin thus obtained will be referred to as binder resin 6.

Example A-1

The following starting materials were mixed on a Henschel mixer, melt-mixed on a double-screw extruder, cooled, pulverized by an ordinary method, and classified by an ordinary method to obtain a toner composition having an average particle diameter of 10 μm.

| <Toner Composition> (starting materials) | (amount) |
|---|---|
| binder resin 1 | 100 parts |
| carbon black (#44) (product of Mitsubishi Chemical Industries, Ltd.) | 7 parts |
| negative charge control agent (Bontron S-34, product of Orient Chemical Industry Co., Ltd.) | 2 parts |
| invention compound (1) | 2 parts |

39 parts of the toner composition thus obtained was mixed with 1261 parts of a resin-coated iron powder to prepare a developer composition. An image was formed on a commercially available electrophotographic copying machine (photoreceptor: amorphous selenium, rotational speed of fixing roller: 255 mm/sec, heat roller temp. in the fixing apparatus being variable, and oil applicator being removed).

The fixing temperature was adjusted to 120° to 220° C. and the image density, image fixability and offset properties of the developer composition and storability and pulverizability of the toner composition were evaluated to obtain the results given in Table 3.

The term "image density" herein is the image density determined with test chart No. 1-T (by Society of Electrophotography) in its black-solid part. The derermination of image density was conducted with the use of a Macbeth reflection densitometer.

Image fixability is given as minimum fixing temperature. The term "minimum fixing temperature" herein is defined as follows: An image fixed on a fixing machine and having the image density of 0.6 was rubbed by reciprocating a rubber/sand eraser having the bottom size of 15 mm×7.5 mm under a load of 500 g five times. The optical reflection density was determined with a Macbeth reflection densitometer before and after the rubbing. The minimum fixing temperature is the temperature of the fixing roller at which the fixing rate defined as given below exceeds 70%.

$$\text{Fixing rate (\%)} = \frac{\text{image density after rubbing}}{\text{image density before rubbing}} \times 100$$

The temperature at which high-temperature offset was caused was determined by visual inspection.

The storability was evaluated in terms of the degree of coagulation caused when 50 g of the toner composition was left to stand at 50° C. at a relative humidity of 40% for 24 h. Namely, the stability was evaluated to be good when the amount of the toner composition remaining on a 42-mesh sieve was less than 3 g and bad when it was 3 g or more.

The pulverizability of the toner composition was evaluated with a simple pulverization test as follows: The toner composition obtained by melt mixing on a double-screw extruder followed by cooling and rough pulverization on ROTOPLEX or the like was sieved to obtain a toner powder which passed a 16-mesh sieve but did not pass a 20-mesh sieve. About 20.00 g of the classfied toner powder was accurately weighed, pulverized on a coffee mill (HR-2170 mfd. by Philips) for 10 see, and sieved through a 32-mesh sieve. The weight (A) g of the toner composition which did not pass the 32-mesh sieve was acculately determined. The residual rate was determined by the formula given below. The above-described operation was repeated three times and the results were classified into the following grades:

| | average residual rate |
|---|---|
| ◎ | 0 to 15.0% |
| ○ | 15.1 to 20.0% |
| x | 20.1 to 100%. |

$$\text{Residual rate (\%)} = \frac{A\ (g)}{\text{wt. of toner composition (about 20.00 g) before milling on coffee mill}} \times 100$$

Examples A-2 to A-10 and Comparative Example 1

Toner compositions and developer compositions were produced from the starting materials listed in Table 2 and the same carbon black and negative charge control agent as those used in Example A-1 in the same manner as that of Example A-1 and the properties of the products were evaluated in the same manner as those described above. The results are given in Table 3.

TABLE 2

| | Binder resin | | Invention compd. | |
|---|---|---|---|---|
| | kind | parts | kind | parts |
| Ex. | | | | |
| A-1 | 1 | 100 | (1) | 2 |
| A-2 | 1 | 100 | (2) | 1 |
| A-3 | 2 | 100 | (3) | 3 |
| A-4 | 3 | 100 | (4) | 2 |
| A-5 | 4 | 100 | (4) | 2 |
| A-6 | 5 | 100 | (5) | 2 |
| A-7 | 5 | 100 | (6) | 2 |
| A-8 | 1 | 100 | (7) | 5 |
| A-9 | 1 | 100 | (7) | 8 |
| A-10 | 6 | 100 | (1) | 2 |
| Comp. Ex. 1 | 1 | 100 | — | — |

TABLE 3

| | Image density | Pulverizability of toner comp. | Minimum fixing temp. (°C.) | High-temp. offset-causing temp. (°C.) | Storability |
|---|---|---|---|---|---|
| Ex. | | | | | |
| A-1 | 1.36 | ◎ | 133 | 220 < | good |
| A-2 | 1.36 | ◎ | 135 | 220 < | good |
| A-3 | 1.35 | ◎ | 135 | 220 < | good |
| A-4 | 1.37 | ◎ | 129 | 220 < | good |
| A-5 | 1.38 | ◎ | 132 | 220 < | good |
| A-6 | 1.36 | ◎ | 139 | 220 < | good |
| A-7 | 1.36 | ◎ | 140 | 220 < | good |
| A-8 | 1.36 | ◎ | 128 | 220 < | good |
| A-9 | 1.36 | ◎ | 127 | 220 < | good |
| A-10 | 1.35 | ◎ | 124 | 220 < | good |
| Comp. Ex. 1 | 1.36 | x | 155 | 220 < | good |

It is apparent from Table 3 that the toner compositions and the developer compositions of the present invention obtained in Examples A-1 to A-10 had a low minimum fixing temperature, and that the toner compositions of the present invention obtained in Examples A-1 to A-10 had excellent storability and pulverizability.

However, the toner composition and the developer composition obtained in Comparative Example 1 had a high minimum fixing temperature and the toner composition obtained in Comparative Example 1 had a poor pulverizability, since they contained none of the developer additive according to the present invention.

Examples B-1 to B-8 and Comparative Example 1

Toner compositions and developer compositions were produced from the starting materials listed in Table 4 and the same carbon black and negative charge control agent as those used in Example A-1 in the same manner as that of Example A-1 and the properties of the products were evaluated in the same manner as those described above. The results are given in Table 5.

TABLE 4

| | Binder resin | | Invention compd. | |
|---|---|---|---|---|
| | kind | parts | kind | parts |
| Ex. | | | | |
| B-1 | 1 | 100 | (11) | 2 |
| B-2 | 1 | 100 | (12) | 1 |
| B-3 | 2 | 100 | (13) | 3 |
| B-4 | 3 | 100 | (14) | 2 |
| B-5 | 4 | 100 | (11) | 2 |
| B-6 | 5 | 100 | (15) | 2 |
| B-7 | 5 | 100 | (16) | 2 |
| B-8 | 6 | 100 | (11) | 2 |
| Comp. Ex. 1 | 1 | 100 | — | — |

TABLE 5

| | Image density | Pulverizability of toner comp. | Minimum fixing temp. (°C.) | High-temp. offset-causing temp. (°C.) | Storability |
|---|---|---|---|---|---|
| Ex. | | | | | |
| B-1 | 1.36 | ◎ | 131 | 220 < | good |
| B-2 | 1.36 | ◎ | 134 | 220 < | good |
| B-3 | 1.35 | ◎ | 133 | 220 < | good |
| B-4 | 1.37 | ◎ | 127 | 220 < | good |
| B-5 | 1.38 | ◎ | 129 | 220 < | good |
| B-6 | 1.36 | ◎ | 139 | 220 < | good |
| B-7 | 1.36 | ◎ | 138 | 220 < | good |
| B-8 | 1.35 | ◎ | 126 | 220 < | good |
| Comp. Ex. 1 | 1.36 | x | 155 | 220 < | good |

It is apparent from Table 5 that the toner compositions and the developer compositions of the present invention obtained in Examples B-1 to B-8 had a low minimum fixing temperature, and that the toner compositions of the present invention obtained in Examples B-1 to B-8 had excellent storability and pulverizability.

However, the toner composition and the developer composition obtained in Comparative Example 1 had a high minimum fixing temperature and the toner composition obtained in Comparative Example 1 had a poor pulverizability, since they contained none of the developer additive according to the present invention.

Examples C-1 to C-8 and Comparative Example 1

Toner compositions and developer compositions were produced from the starting materials listed in Table 6 and the same carbon black and negative charge control agent as those used in Example A-1 in the same manner as that of Example A-1 and the properties of the products were evaluated in the same manner as those described above. The results are given in Table 7.

TABLE 6

| | Binder resin | | Invention compd. | |
|---|---|---|---|---|
| | kind | parts | kind | parts |
| Ex. | | | | |
| C-1 | 1 | 100 | (21) | 2 |
| C-2 | 1 | 100 | (23) | 1 |
| C-3 | 2 | 100 | (21) | 3 |
| C-4 | 3 | 100 | (21) | 2 |
| C-5 | 4 | 100 | (21) | 2 |
| C-6 | 5 | 100 | (22) | 2 |
| C-7 | 5 | 100 | (23) | 2 |
| C-8 | 6 | 100 | (21) | 2 |
| Comp. Ex. 1 | 1 | 100 | — | — |

TABLE 7

| | Image density | Pulverizability of toner comp. | Minimum fixing temp. (°C.) | High-temp. offset-causing temp. (°C.) | Storability |
|---|---|---|---|---|---|
| Ex. | | | | | |
| C-1 | 1.36 | ◎ | 133 | 220 < | good |
| C-2 | 1.36 | ◎ | 136 | 220 < | good |
| C-3 | 1.35 | ◎ | 131 | 220 < | good |
| C-4 | 1.37 | ◎ | 129 | 220 < | good |
| C-5 | 1.35 | ◎ | 135 | 220 < | good |
| C-6 | 1.36 | ◎ | 140 | 220 < | good |
| C-7 | 1.36 | ◎ | 141 | 220 < | good |
| C-8 | 1.35 | ◎ | 127 | 220 < | good |
| Comp. Ex. 1 | 1.36 | x | 155 | 220 < | good |

It is apparent from Table 7 that the toner compositions and the developer compositions of the present invention obtained in Examples C-1 to C-8 had a low minimum fixing temperature, and that the toner compositions of the present invention obtained in Examples C-1 to C-8 had excellent storability and pulverizability.

However, the toner composition and the developer composition obtained in Comparative Example 1 had a high minimum fixing temperature and the toner composition obtained in Comparative Example 1 had a poor pulverizability, since they contained none of the developer additive according to the present invention.

Examples D-1 to D-10 and Comparative Example 1

Toner compositions and developer compositions were produced from the starting materials listed in Table 8 and the same carbon black and negative charge control agent as those used in Example A-1 in the same manner as that of Example A-1 and the properties of the products were evaluated in the same manner as those described above. The results are given in Table 9.

TABLE 8

| | Binder resin | | Invention compd. | |
|---|---|---|---|---|
| | kind | parts | kind | parts |
| Ex. | | | | |
| D-1 | 1 | 100 | (31) | 2 |
| D-2 | 1 | 100 | (32) | 1 |
| D-3 | 2 | 100 | (33) | 3 |
| D-4 | 3 | 100 | (34) | 2 |
| D-5 | 4 | 100 | (34) | 2 |
| D-6 | 5 | 100 | (35) | 2 |
| D-7 | 5 | 100 | (36) | 2 |
| D-8 | 1 | 100 | (37) | 6 |
| D-9 | 1 | 100 | (38) | 7 |
| D-10 | 6 | 100 | (31) | 2 |
| Comp. Ex. 1 | 1 | 100 | — | — |

TABLE 9

| | Image density | Pulverizability of toner comp. | Minimum fixing temp. (°C.) | High-temp. offset-causing temp. (°C.) | Storability |
|---|---|---|---|---|---|
| Ex. | | | | | |
| D-1 | 1.36 | ◎ | 134 | 220 < | good |
| D-2 | 1.36 | ◎ | 134 | 220 < | good |
| D-3 | 1.35 | ◎ | 132 | 220 < | good |
| D-4 | 1.37 | ◎ | 128 | 220 < | good |
| D-5 | 1.37 | ◎ | 131 | 220 < | good |
| D-6 | 1.36 | ◎ | 138 | 220 < | good |
| D-7 | 1.36 | ◎ | 139 | 220 < | good |
| D-8 | 1.36 | ◎ | 127 | 220 < | good |
| D-9 | 1.36 | ◎ | 128 | 220 < | good |
| D-10 | 1.37 | ◎ | 126 | 220 < | good |
| Comp. Ex. 1 | 1.36 | x | 154 | 220 < | good |

It is apparent from Table 9 that the toner compositions and the developer compositions of the present invention obtained in Examples D-1 to D-10 had a low minimum fixing temperature, and that the toner compositions of the present invention obtained in Examples D-1 to D-10 had excellent storability and pulverizability.

However, the toner composition and the developer composition obtained in Comparative Example 1 had a high minimum fixing temperature and the toner composition obtained in Comparative Example 1 had a poor pulverizability, since they contained none of the developer additive according to the present invention.

Examples E-1 to E-10 and Comparative Example 1

Toner compositions and developer compositions were produced from the starting materials listed in Table 10 and the same carbon black and negative charge control agent as those used in Example A-1 in the same manner as that of Example A-1 and the properties of the products were evaluated in the same manner as those described above. The results are given in Table 11.

TABLE 10

| | Binder resin | | Invention compd. | |
|---|---|---|---|---|
| | kind | parts | kind | parts |
| Ex. | | | | |
| E-1 | 1 | 100 | (41) | 2 |
| E-2 | 1 | 100 | (42) | 1 |
| E-3 | 2 | 100 | (43) | 3 |
| E-4 | 3 | 100 | (44) | 2 |
| E-5 | 4 | 100 | (44) | 2 |
| E-6 | 5 | 100 | (45) | 2 |
| E-7 | 5 | 100 | (46) | 5 |
| E-8 | 1 | 100 | (47) | 5 |
| E-9 | 1 | 100 | (47) | 8 |
| E-10 | 6 | 100 | (47) | 3 |
| Comp. Ex. 1 | 1 | 100 | — | — |

TABLE 11

| | Image density | Pulverizability of toner comp. | Minimum fixing temp. (°C.) | High-temp. offset-causing temp. (°C.) | Storability |
|---|---|---|---|---|---|
| Ex. | | | | | |
| E-1 | 1.36 | ◎ | 131 | 220 < | good |
| E-2 | 1.36 | ◎ | 136 | 220 < | good |
| E-3 | 1.35 | ◎ | 132 | 220 < | good |
| E-4 | 1.37 | ◎ | 128 | 220 < | good |
| E-5 | 1.37 | ◎ | 131 | 220 < | good |
| E-6 | 1.36 | ◎ | 141 | 220 < | good |
| E-7 | 1.36 | ◎ | 142 | 220 < | good |
| E-8 | 1.36 | ◎ | 129 | 220 < | good |
| E-9 | 1.36 | ◎ | 128 | 220 < | good |
| E-10 | 1.37 | ◎ | 127 | 220 < | good |
| Comp. Ex. 1 | 1.36 | x | 157 | 220 < | good |

It is apparent from Table 11 that the toner compositions and the developer compositions of the present invention obtained in Examples E-1 to E-10 had a low minimum fixing temperature, and that the toner compositions of the present invention obtained in Examples E-1 to E-10 had excellent storability and pulverizability.

However, the toner composition and the developer composition obtained in Comparative Example 1 had a high minimum fixing temperature and the toner composition obtained in Comparative Example 1 had a poor pulverizability, since they contained none of the developer additive according to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A toner composition comprising a developer additive represented by the formula (1), a binder resin and a colorant:

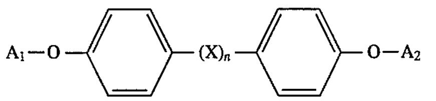

(1)

wherein $A_1$ and $A_2$ each represents an alkyl group, an alkenyl group or an arylalkyl group, n represents 0 or 1, and X is selected from the group consisting of

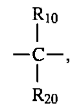

—S—, —$SO_2$— and —O—, and $R_{10}$ and $R_{20}$ each represents a hydrogen atom or an alkyl group having 1–4 carbon atoms, wherein the amount of developer additive is 0.1 to 10.0% by weight based on the weight of the binder.

2. The toner comosition according to claim 1, wherein the binder resin is at least one member selected from the group consisting of polyesters, polyester polyamides and polyamides.

3. The toner composition according to claim 2, wherein the binder resin is a polyester comprising, as the constituent unit monomers, an acid component and a diol component that is a mixture of compounds represented by the following formula (6), with the proviso that the compounds have the same alkylene group for $R_3$ and the mixture has the sum of x and y of 2 to 16 as the average value:

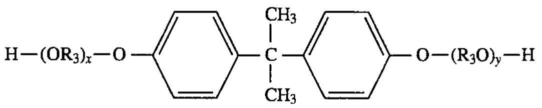 (6)

wherein $R_3$ represents an alkylene group having 2 to 4 carbon atoms, and x and y each represent a positive integer.

4. The toner composition according to claim 1, wherein the binder resin is a vinylic resin.

5. The toner composition according to claim 1, wherein $A_1$ and $A_2$ of formula (1) each represents a $C_{6-18}$ alkyl group, a $C_{6-18}$ alkenyl group or a $C_{6-18}$ arylalkyl group.

6. The toner composition according to claim 1, wherein $A_1$ and $A_2$ of formula (1) each represents a straight or branched chain alkyl group selected from the group consisting of n-hexyl, n-octyl, n-dodecyl, n-octadecyl, 2-hexyldecyl and methyl-branched octadecyl, or an arylalkyl group selected from the group consisting of benzyl and 2-phenylethyl.

7. The toner composition of claim 1, wherein the amount of the additive is 0.5 to 8.0% by weight based on the weight of the binder resin.

8. The toner composition according to claim 1, wherein the compound represented by formula (1) is selected from the group consisting of

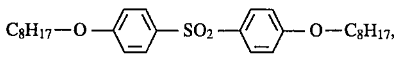

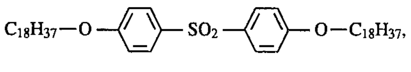

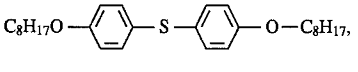

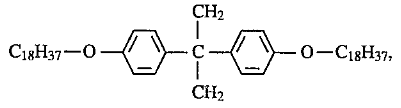

-continued

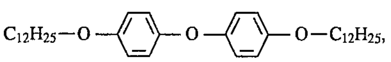

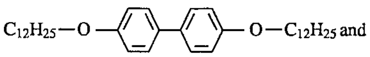 and

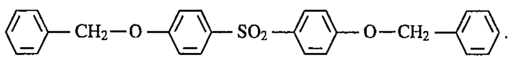

9. A developer composition comprising a toner comprising a developer additive represented by the formula (1), a binder resin, and a colorant, and a carrier:

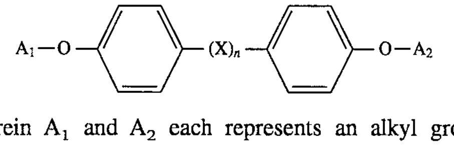 (1)

wherein $A_1$ and $A_2$ each represents an alkyl group, an alkenyl group or an arylalkyl group, n represents 0 or 1, and X is selected from the group consisting of

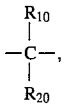

—S—, —$SO_2$—, and —O—, and $R_{10}$ and $R_{20}$ each represents a hydrogen atom or an alkyl group having 1–4 carbon atoms, wherein the amount of developer additive is 0.1 to 10.0% by weight based on the weight of the binder.

10. The developer composition according to claim 9, wherein the binder resin is at least one member selected from the group consisting of polyesters, polyester polyamides and polyamides.

11. The developer composition according to claim 10, wherein the binder resin is a polyester comprising, as the constituent unit monomers, an acid component and a diol component that is a mixture of compounds represented by the following formula (6), with the proviso that the compounds have the same alkylene group for $R_3$ and the mixture has the sum of x and y of 2 to 16 as the average value:

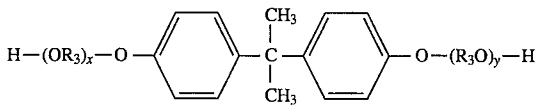 (6)

wherein $R_3$ represents an alkylene group having 2 to 4 carbon atoms, and x and y each represent a positive integer.

12. The developer composition according to claim 9, wherein the binder resin is a vinylic resin.

* * * * *